United States Patent
Wilson et al.

(10) Patent No.: US 10,487,595 B2
(45) Date of Patent: Nov. 26, 2019

(54) COLLAR WITH STEPPED RETAINING RING GROOVE

(71) Applicant: The Charles Machine Works, Inc., Perry, OK (US)

(72) Inventors: Dirk A. Wilson, Stillwater, OK (US); Greg L. Slaughter, Jr., Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 190 days.

(21) Appl. No.: 15/637,988

(22) Filed: Jun. 29, 2017

(65) Prior Publication Data

US 2018/0002990 A1  Jan. 4, 2018

Related U.S. Application Data

(60) Provisional application No. 62/357,297, filed on Jun. 30, 2016.

(51) Int. Cl.

| | |
|---|---|
| *E21B 17/046* | (2006.01) |
| *F16D 1/116* | (2006.01) |
| *F16L 25/06* | (2006.01) |
| *F16L 21/08* | (2006.01) |
| *F16D 1/10* | (2006.01) |
| *E21B 7/04* | (2006.01) |
| *E21B 7/06* | (2006.01) |

(52) U.S. Cl.
CPC .......... *E21B 17/046* (2013.01); *F16D 1/116* (2013.01); *F16L 21/08* (2013.01); *F16L 25/06* (2013.01); *E21B 7/046* (2013.01); *E21B 7/062* (2013.01); *F16D 2001/102* (2013.01)

(58) Field of Classification Search
CPC ........ E21B 17/046; E21B 7/046; E21B 7/062; F16L 21/08; F16L 21/186; F16L 21/183; F16L 25/06; F16L 33/224; F16L 19/065; F16D 1/116; F16D 2011/102
USPC .......................... 403/102; 285/411, 415, 321
See application file for complete search history.

(56) References Cited

U.S. PATENT DOCUMENTS

| | | |
|---|---|---|
| 502,686 A | 8/1893 | Tilton |
| 738,503 A | 9/1903 | Waters |
| 2,509,081 A | 1/1945 | Bluth et al. |
| 2,998,988 A | 9/1961 | Barrett |
| 3,326,580 A | 6/1967 | Munier et al. |
| 3,832,076 A | 8/1974 | Gehrke |
| 3,865,499 A * | 2/1975 | Flichy .................. F16B 21/183 403/326 |

(Continued)

*Primary Examiner* — David Carroll
(74) *Attorney, Agent, or Firm* — Tomlinson McKinstry, P.C.

(57) ABSTRACT

An assembly for a torque-transmitting connection in an inner pipe string of a dual-member drill string is formed from a collar, a retaining ring, and an inner pipe member. An endless internal groove having adjacent shallow and deep sections is formed in the collar. Formed in the inner pipe member, an endless external groove is situated in concentric relationship with the internal groove. The retaining ring, situated within the grooves, resists disconnection of the collar from the inner pipe member. When the assembly is subjected to an axial force that might otherwise tend to pull it apart, the retaining ring resists the tendency by wedging between the bottom of the shallow section of the internal groove and the crest of the external groove.

16 Claims, 13 Drawing Sheets

(56) References Cited

U.S. PATENT DOCUMENTS

| | | | |
|---|---|---|---|
| 4,802,700 A * | 2/1989 | Stevenson | F16B 21/078 |
| | | | 292/327 |
| 4,872,710 A | 10/1989 | Konecny et al. | |
| 5,176,413 A | 1/1993 | Westman | |
| 5,490,569 A | 2/1996 | Brotherton et al. | |
| 5,499,884 A | 3/1996 | Kuhnhold et al. | |
| 5,682,956 A | 11/1997 | Deken et al. | |
| 6,439,319 B1 | 8/2002 | Wentworth et al. | |
| 6,454,025 B1 | 9/2002 | Runquist et al. | |
| 6,659,202 B2 | 12/2003 | Runquist et al. | |
| RE38,418 E | 2/2004 | Deken et al. | |
| 7,025,152 B2 | 4/2006 | Sharp et al. | |
| 7,216,724 B2 | 5/2007 | Self et al. | |
| 7,389,831 B2 | 6/2008 | Mullins et al. | |
| 7,694,753 B2 | 4/2010 | Carlson et al. | |
| 8,201,644 B2 | 6/2012 | Hall et al. | |
| RE44,427 E | 8/2013 | Runquist et al. | |
| 8,534,388 B2 | 9/2013 | Hall et al. | |
| 2005/0103527 A1 | 5/2005 | Church | |
| 2006/0188328 A1 | 8/2006 | Gutierrez et al. | |
| 2006/0211505 A1 | 9/2006 | Fukumura et al. | |
| 2008/0078584 A1* | 4/2008 | Lyon | E21B 4/14 |
| | | | 175/171 |
| 2012/0227985 A1* | 9/2012 | Valisalo | E21B 7/20 |
| | | | 166/380 |
| 2013/0068490 A1 | 3/2013 | Van Zee et al. | |
| 2014/0027184 A1* | 1/2014 | Slaughter, Jr. | E21B 17/00 |
| | | | 175/62 |
| 2014/0102799 A1 | 4/2014 | Stringer et al. | |
| 2014/0202706 A1* | 7/2014 | Howell | E21B 34/102 |
| | | | 166/374 |
| 2015/0233192 A1* | 8/2015 | Slaughter, Jr. | E21B 17/18 |
| | | | 175/320 |

* cited by examiner

COLLAR WITH STEPPED RETAINING RING GROOVE

CROSS REFERENCE TO RELATED APPLICATION

This application claims the benefit of U.S. Provisional Patent Application Ser. No. 62/357,297 filed Jun. 30, 2016, the entire contents of which are incorporated herein by reference.

SUMMARY

An assembly is formed from a tubular collar, a pipe member, and a retaining ring. The tubular collar has opposed first and second ends and an endless internal groove positioned adjacent the first end. Formed in the groove is a step-like base that defines adjacent shallow and deep sections. The pipe member has an end positioned within the collar and an endless external groove positioned adjacent the end. The external groove of the pipe member is situated in concentric relationship with the internal groove of the collar. Situated within both grooves is the retaining ring.

A kit includes a tubular collar, a pipe member, and a retaining ring. The tubular collar has an endless internal groove. Formed in the groove is a step-like base defining adjacent shallow and deep sections. The pipe member has an end and an endless external groove positioned adjacent the end. The external groove is configured to be concentric with the internal groove when the end of the pipe member is received within the collar. Sized to be retained within the internal groove, the retaining ring has a maximum cross-sectional dimension that exceeds the depth of the shallow section.

A tubular collar having opposed first and second ends is formed from an outer surface, an inner surface, and an endless groove formed in the inner surface. The outer surface is symmetric about a collar axis and has a circular cross-sectional profile. The inner surface has the cross-sectional profile of a polygon that has a centroid situated on the collar axis. Concentric with the collar axis and positioned adjacent the collar's first end, the groove has axially offset shallow and deep sections.

DETAILED DESCRIPTION

Figure 12:
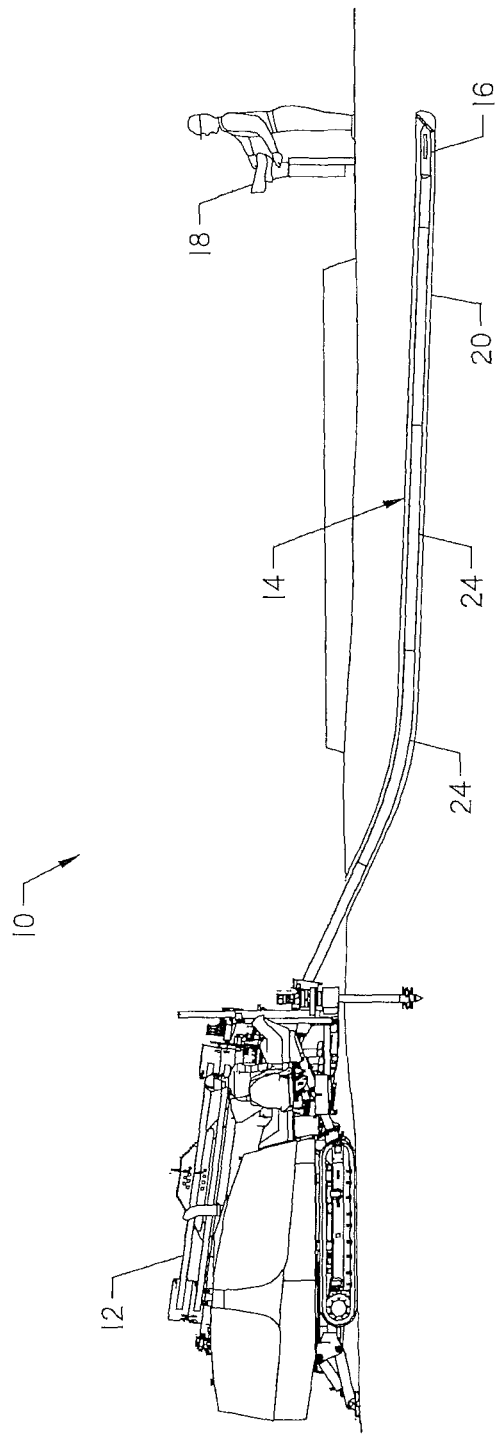
FIG. 12 is a side elevation view of a horizontal directional drilling operation in which a dual-member drill string is used to drill a borehole.
Figure 13:
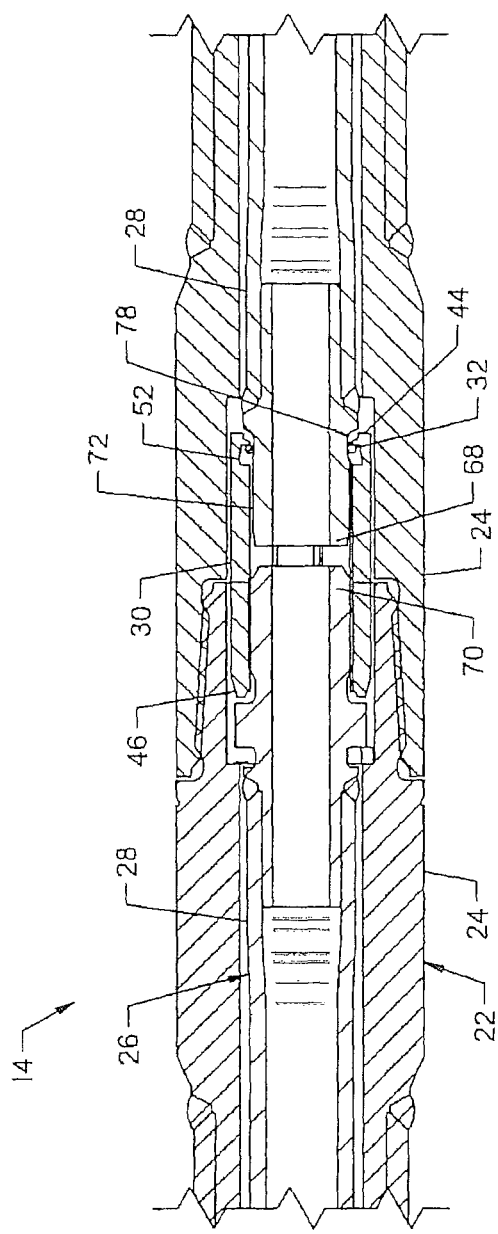
FIG. 13 is a cross-sectional view of a portion of the dual-member drill string of FIG. 12.

FIGS. 12 and 13 illustrate a horizontal directional drilling system to comprising a drilling rig 12, a dual-member drill string 14, a beacon 16, a tracker 18, and a borehole 20. The dual-member drill string 14 comprises an outer drill string 22 formed from a plurality of adjacent outer pipe members 24 and an inner drill string 26 formed from a plurality of adjacent inner pipe members 28. Adjacent outer pipe members 24 are joined together by a threaded connection. Adjacent inner pipe members 28 are joined together by a torque-transmitting connection that includes a collar 30 and a retaining ring 32.

Dual-member drill strings, such as drill string 14, are configured to allow relative rotation between the inner drill string 26 and outer drill string 22, such that rotation of each component drill string 22, 26 may perform a separate function. For example, the outer drill string 22 may provide for steering of the drill string 14 while the inner drill string 26 may rotate a drill bit (not shown) at the terminal end of the drill string 14.

Geometric collars, such as collar 30, allow for easier make-up of adjacent inner pipe members 28. Further description of dual-member drill strings 14 and pipe joints between adjacent sections is found in U.S. Pat. No. RE 38,418, issued to Deken, the contents of which are fully incorporated herein by reference.

Figure 1:
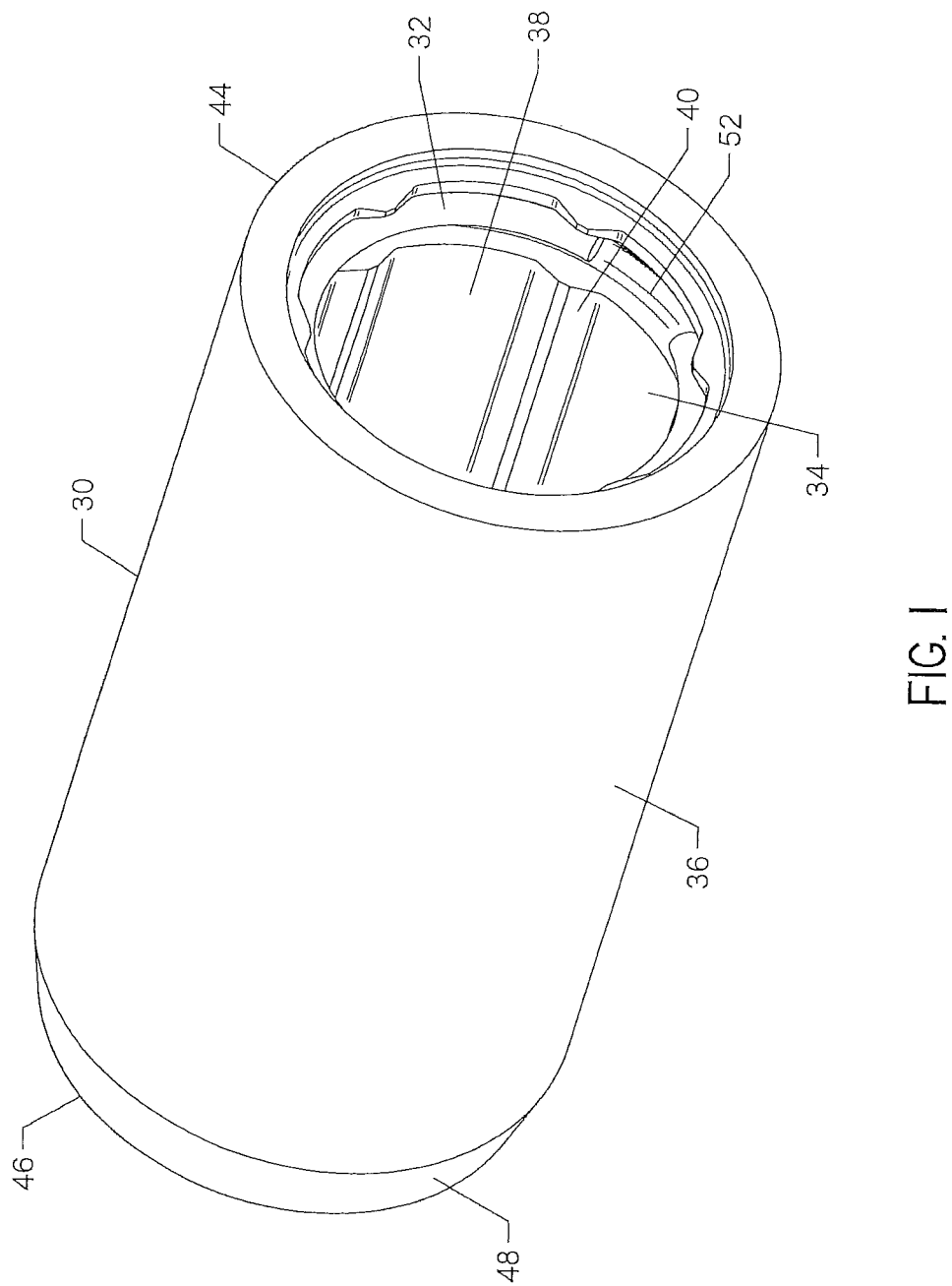
FIG. 1 is a perspective view of a collar having an internal groove in which a retaining ring is positioned.
Figure 2:
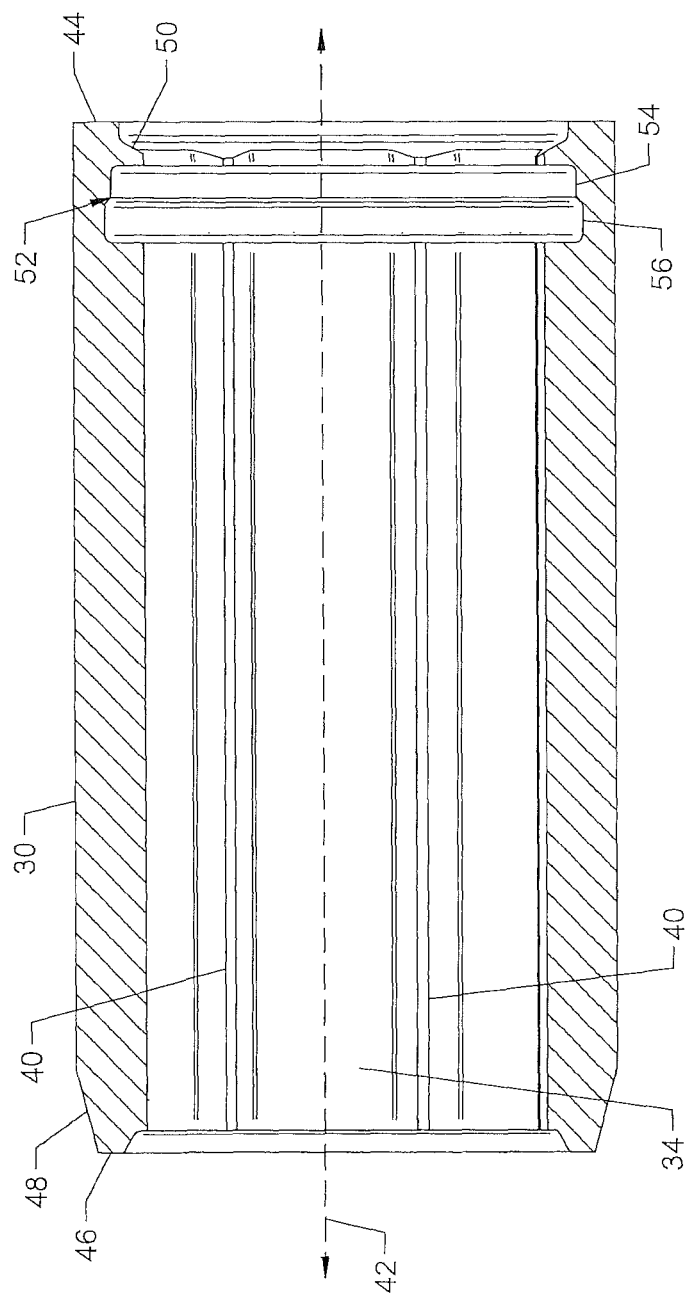
FIG. 2 is a cross-sectional view of the collar of FIG. 1, taken along a plane that contains its longitudinal axis.
Figure 3:
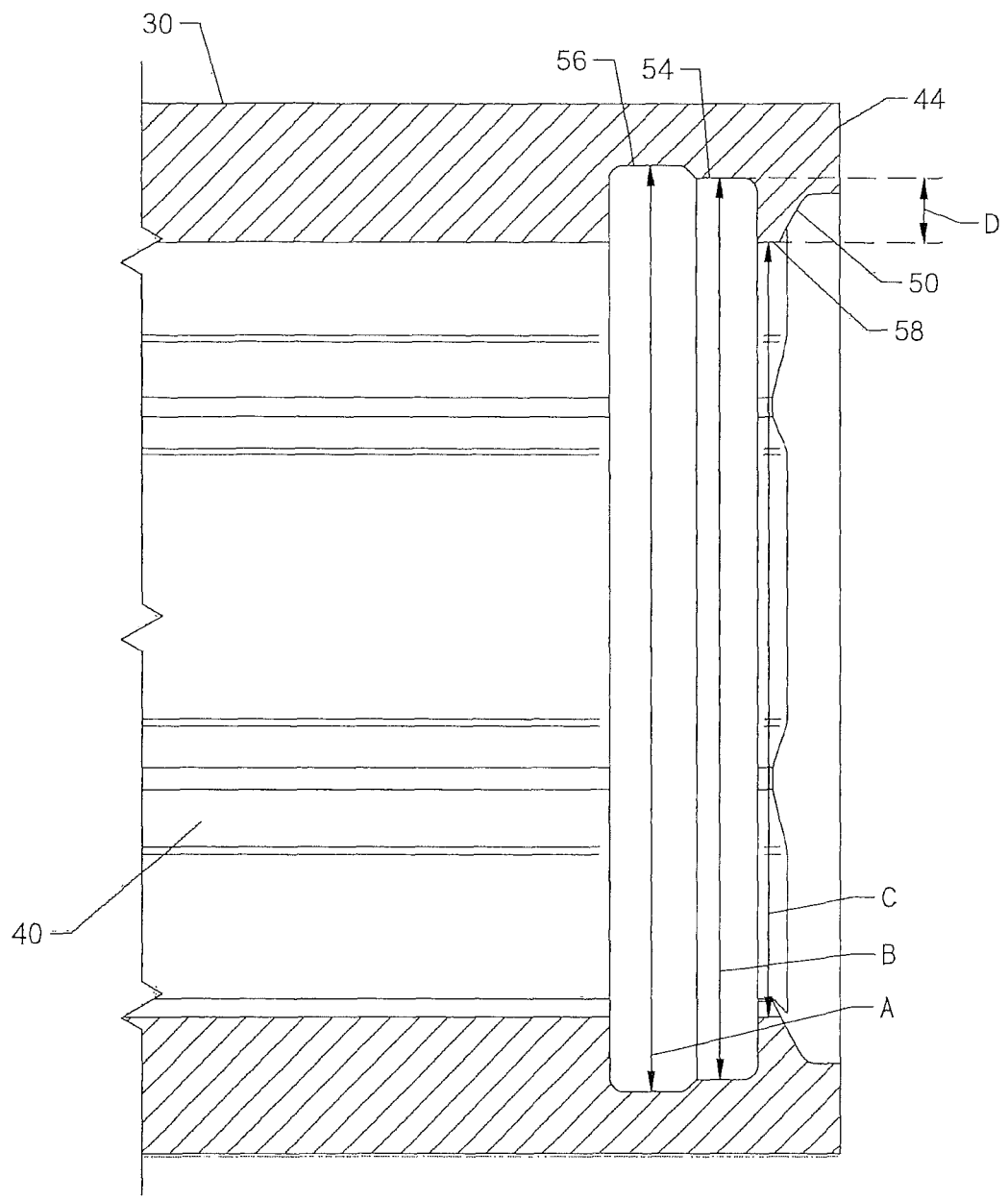
FIG. 3 is an enlarged view of an end of the collar of FIG. 2.

With reference to FIGS. 1-3, the collar 30 is a tubular member formed from a strong and durable material such as steel. The collar 30 has an inner surface 34, an outer surface 36, and a passage 38. Formed on the inner surface 34 are a plurality of raised longitudinal ridges 40. Preferably, the inner surface 34 has six raised longitudinal ridges 40.

Situated on a longitudinal collar axis 42, the collar 30 has opposed first and second ends 44, 46. Adjacent the second end 46, the collar 30 may have an area of gradually reducing outer circumference 48. Adjacent the first end 44, a shoulder 50 and an endless internal groove 52 are formed in the inner surface 34 of the collar 30. The groove 52 comprises a shallow section 54 and a deep section 56. The shallow section 54 is situated between the deep section 56 and the first end of the collar 44, and the shallow section 54 has a depth D. The deep section 56, the shallow section 54, and a section of the inner surface adjacent the shoulder 58 have maximum cross-sectional dimensions A, B, and C, respectively. Depth D should be understood to be substantially one-half of the difference between dimensions B and C.

Figure 4:
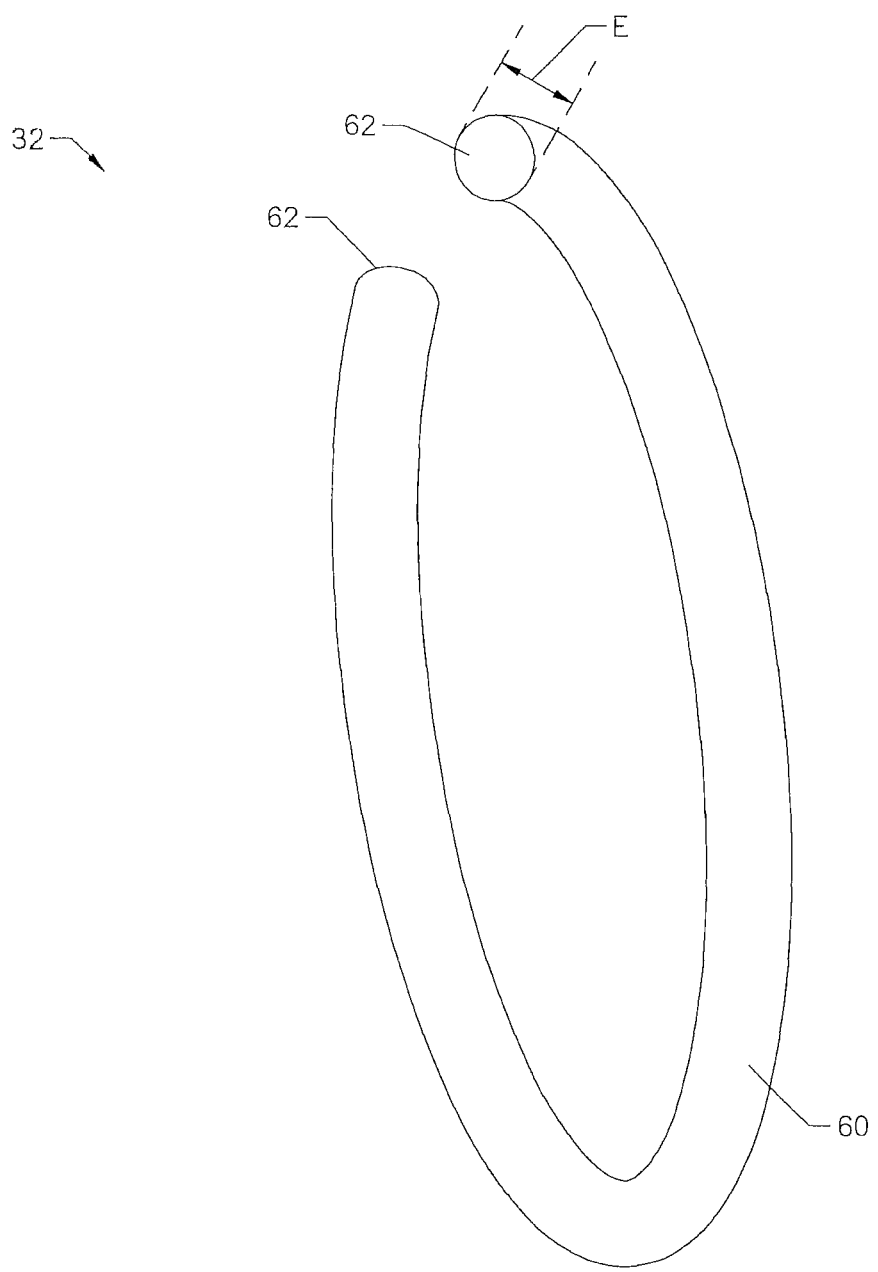
FIG. 4 is a perspective view of the retaining ring of FIG. 1.
Figure 5:
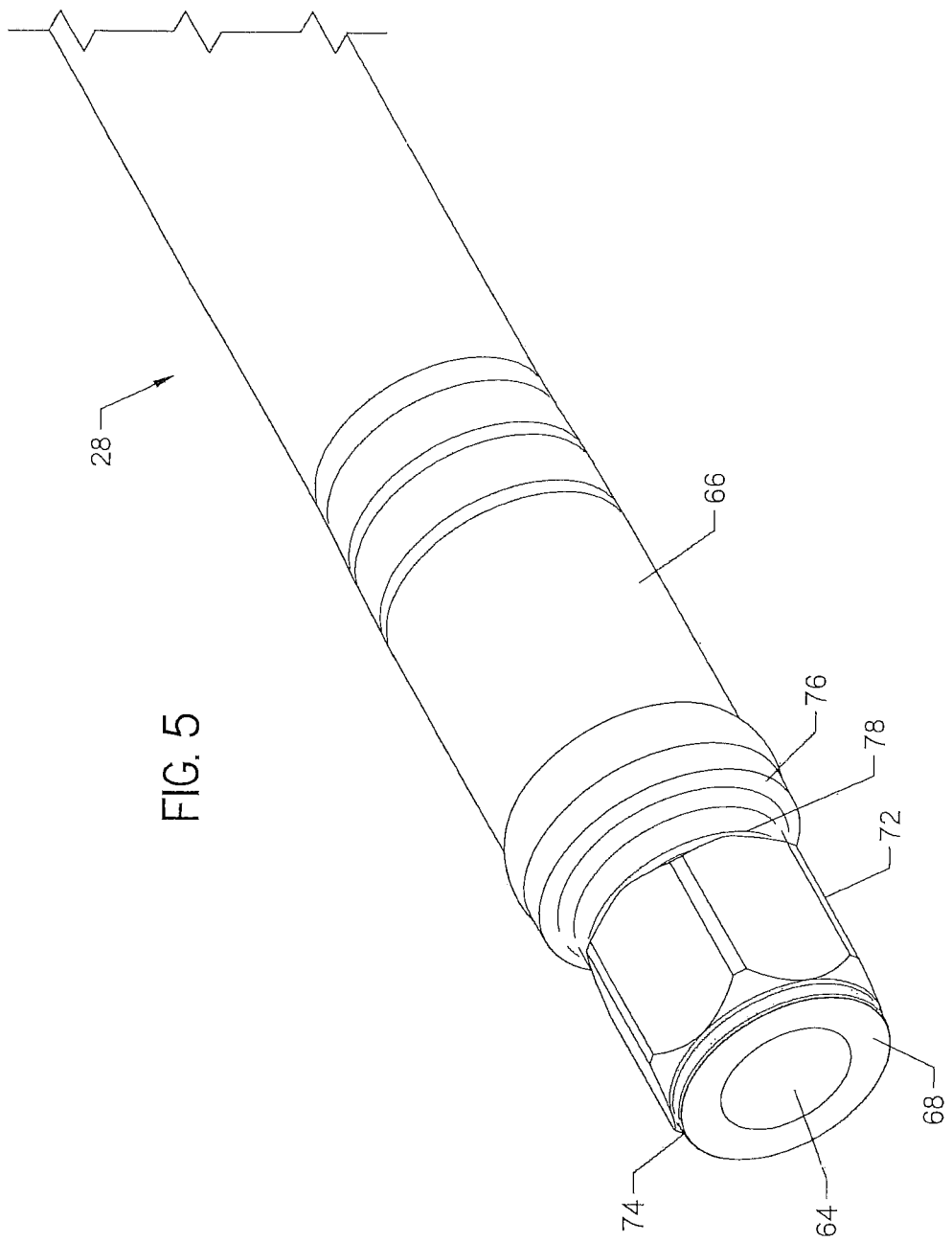
FIG. 5 is a perspective view of a first end of an inner pipe member.
Figure 6:
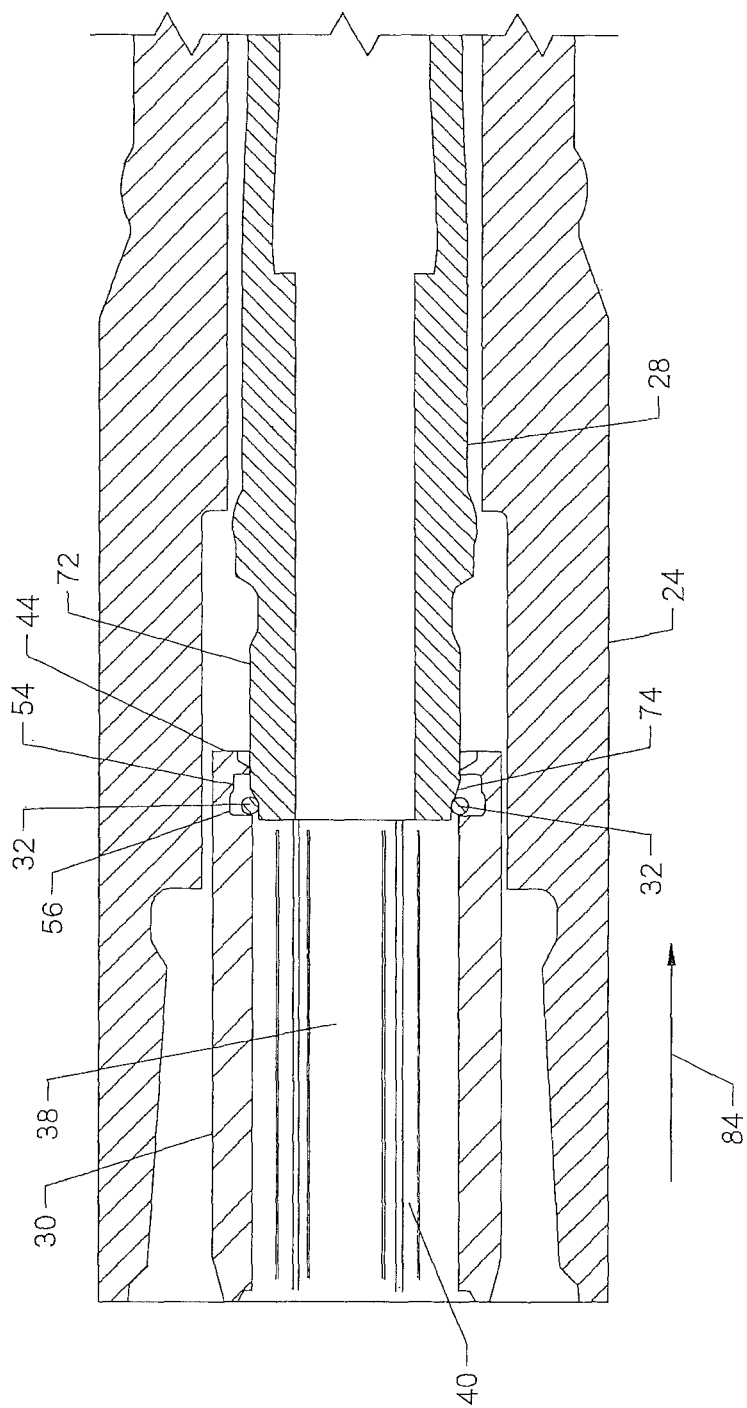
FIG. 6 is a cross-sectional view of a partial dual-member drill string showing the collar and the retaining ring of FIG. 1 being slid onto the first end of the inner pipe member of FIG. 5.

Shown in FIGS. 1 and 4, the retaining ring 32 is formed from a strong and durable material such as steel. The retaining ring 32 has an arched body 60 having a pair of opposed retaining ring ends 62. The ends 62 may be pressed together or sprung apart to change the effective outer circumference measured around the retaining ring 32. Measurement of effective outer circumference should include any space between the ends 62. The retaining ring 32 is characterized by a maximum cross-sectional dimension E, which exceeds the depth D of the shallow section 54. In a relaxed position, the retaining ring 32 is sized to be retained within the internal groove 52 of the collar 30.

As shown in FIG. 4, the retaining ring ends 62 are separated by a gap and situated in face-to-face relationship. However, in other embodiments, the retaining ring 32 may have a spiral form in which the ends 62 overlap the arched body 60.

As best shown in FIG. 1, the retaining ring 32 is installed in the collar 30 by pressing the retaining ring ends 62 together to reduce the effective outer circumference of the retaining ring 32. Under compression, the retaining ring 32 is inserted into the passage 38 at the first end 44 of the collar 30. Then the retaining ring 32 is allowed to expand circumferentially within the groove 52. Once situated in the groove 52, the axial movement of the retaining ring 32 is limited to the area bounded by the groove 52.

Figure 9:
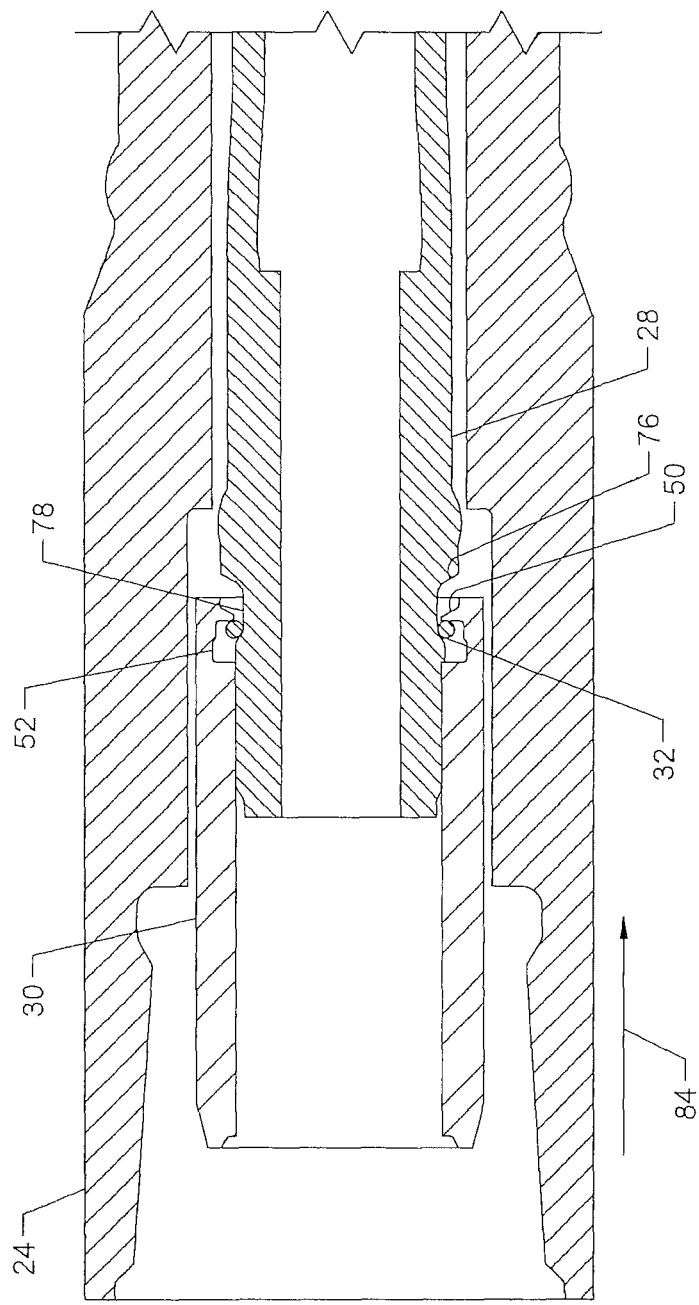
FIG. 9 is a cross-sectional view of the partial dual-member drill string of claim 6 showing the collar and retaining ring fully installed on the first end of the inner pipe member.
Figure 10:
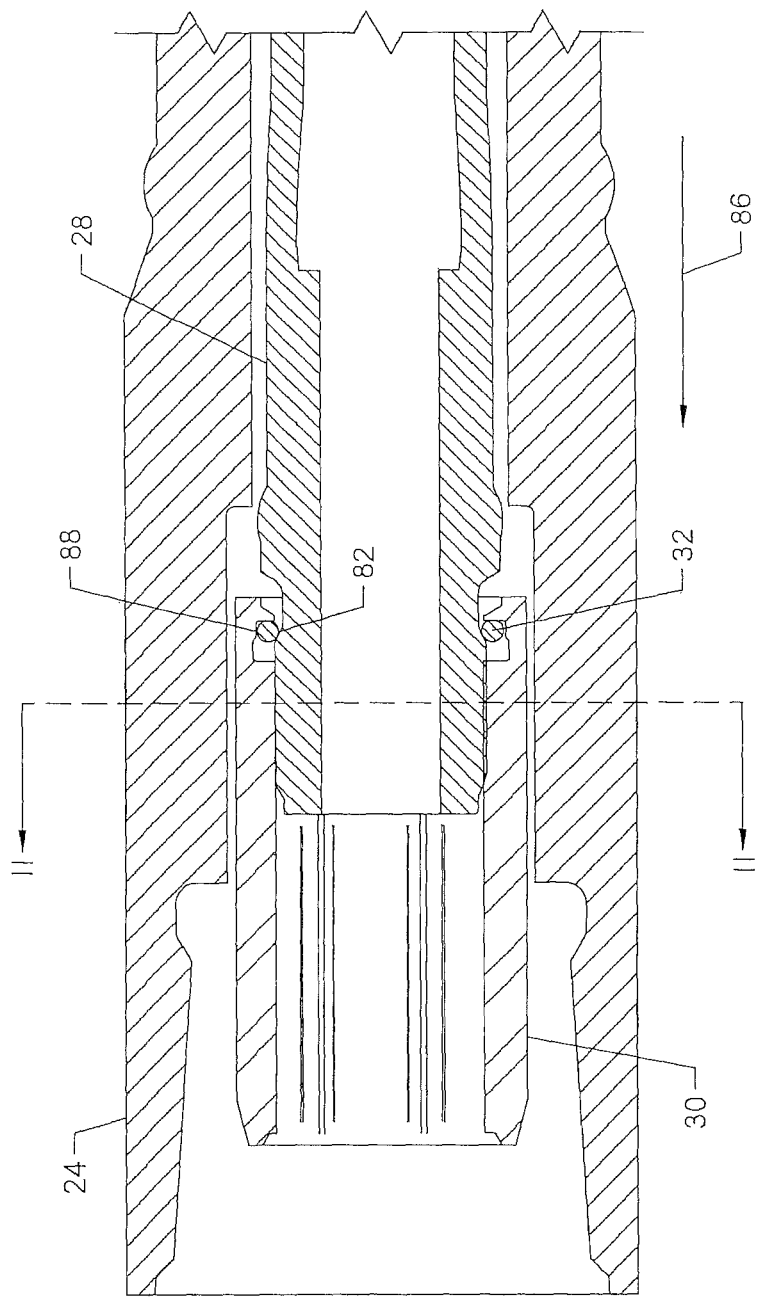
FIG. 10 is a cross-sectional view of the partial dual-member drill string of claim 6 showing the retaining ring wedged between the collar and the inner pipe member such that axial movement of the collar relative to the inner pipe member is restricted.
Figure 11:
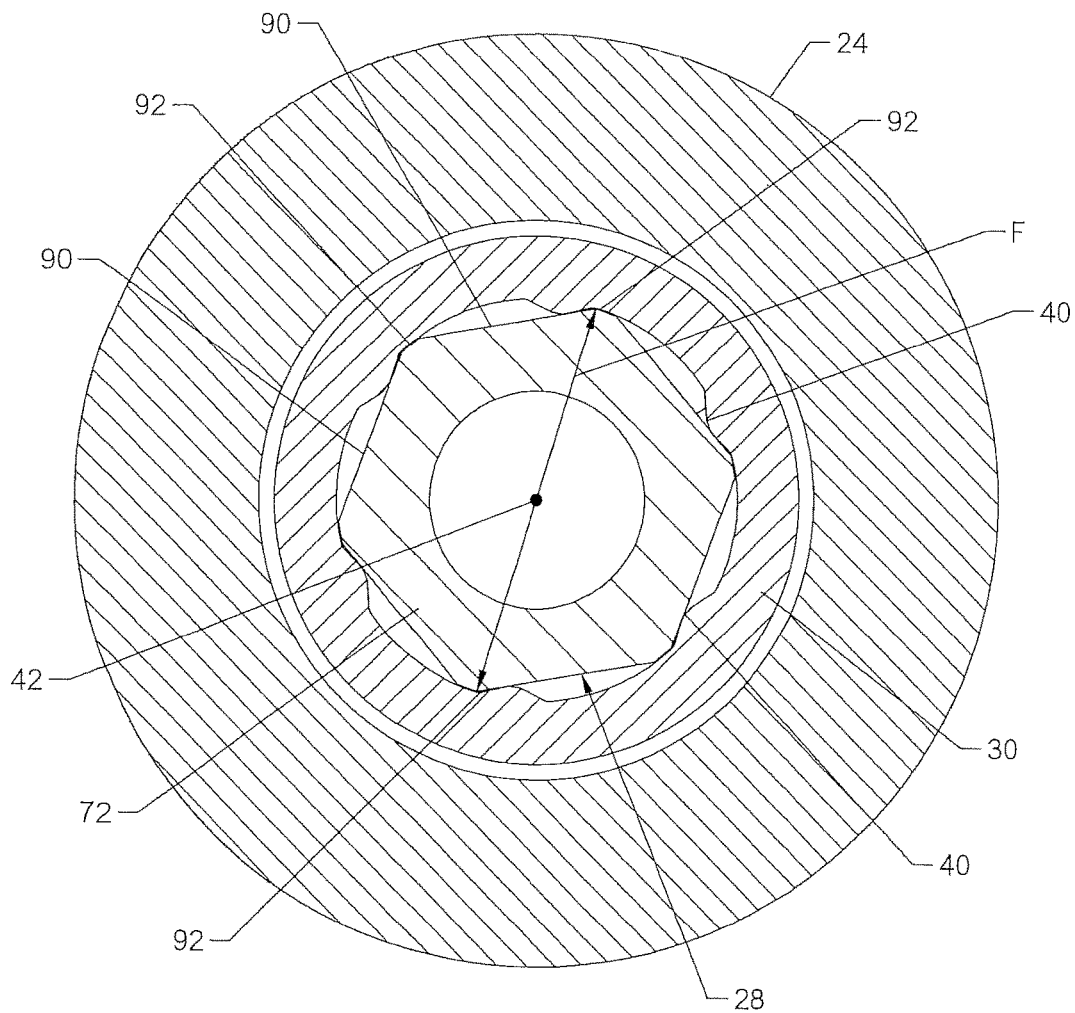
FIG. 11 is a cross-sectional view of the dual-member drill string of Figure to taken along line 11-11.

Shown in FIGS. 5-11 and 13, the inner pipe member 28 is formed from a strong and durable material such as steel. The inner pipe member 28 has an inner surface 64, an outer surface 66, and opposed first and second ends 68, 70. The inner pipe member 28 has a first end section 72 sized to be received within the collar 30. As shown in FIG. 11, the first end section 72 has a hexagonal cross-sectional profile. In other embodiments, the first end section 72 may have the cross-sectional profile of a triangle, a square, a pentagon, a heptagon, an octagon, or any other suitable polygonal shape. The first end section 72 may have a beveled portion 74.

Figure 8:
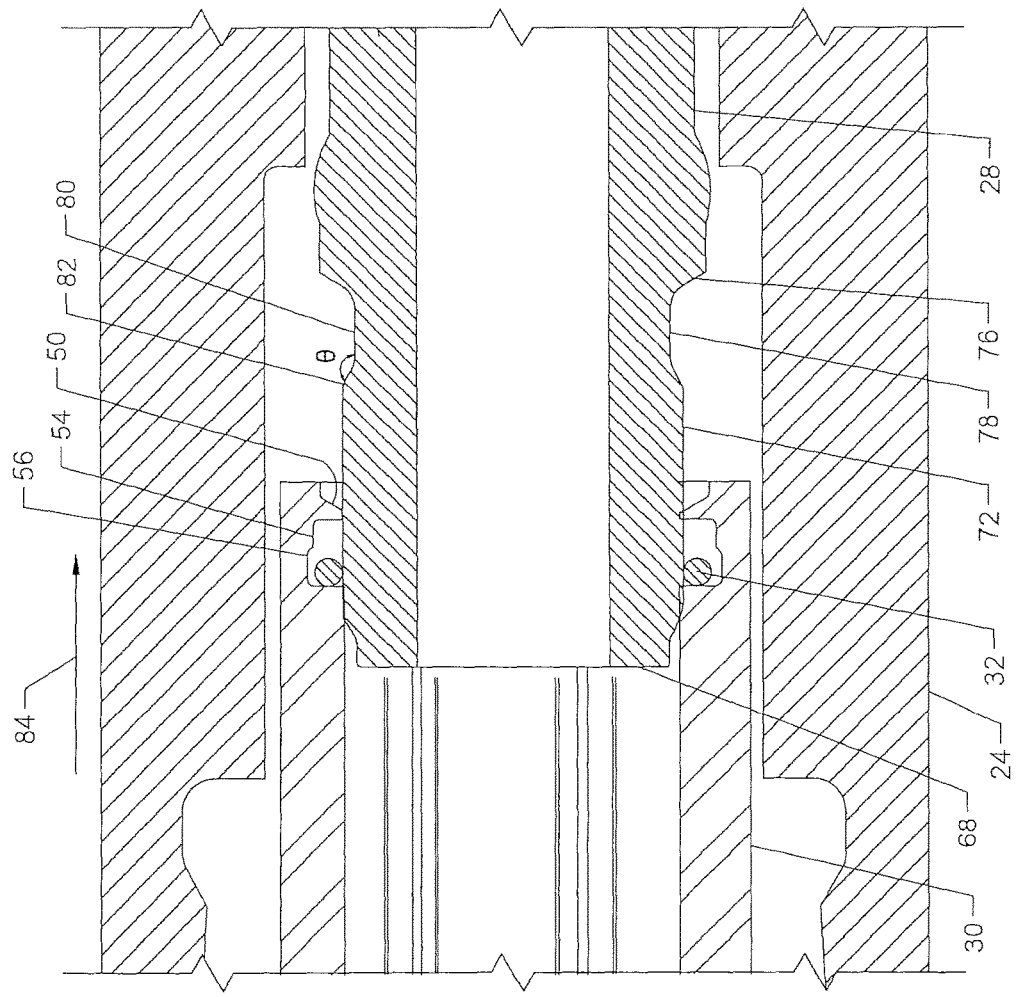
FIG. 8 is an enlarged view of a portion of the partial dual-member drill string of FIG. 7.

Formed in the outer surface 66 of the inner pipe member 28, an external shoulder 76 and an endless external groove 78 are positioned adjacent the first end 68. With reference to FIG. 8, the external groove 78 has a bottom 80 and a ramp 82. An internal angle θ between the bottom 80 and the ramp 82 may be between 120 and 165 degrees. Preferably, the internal angle θ is 135 degrees.

Figure 7:
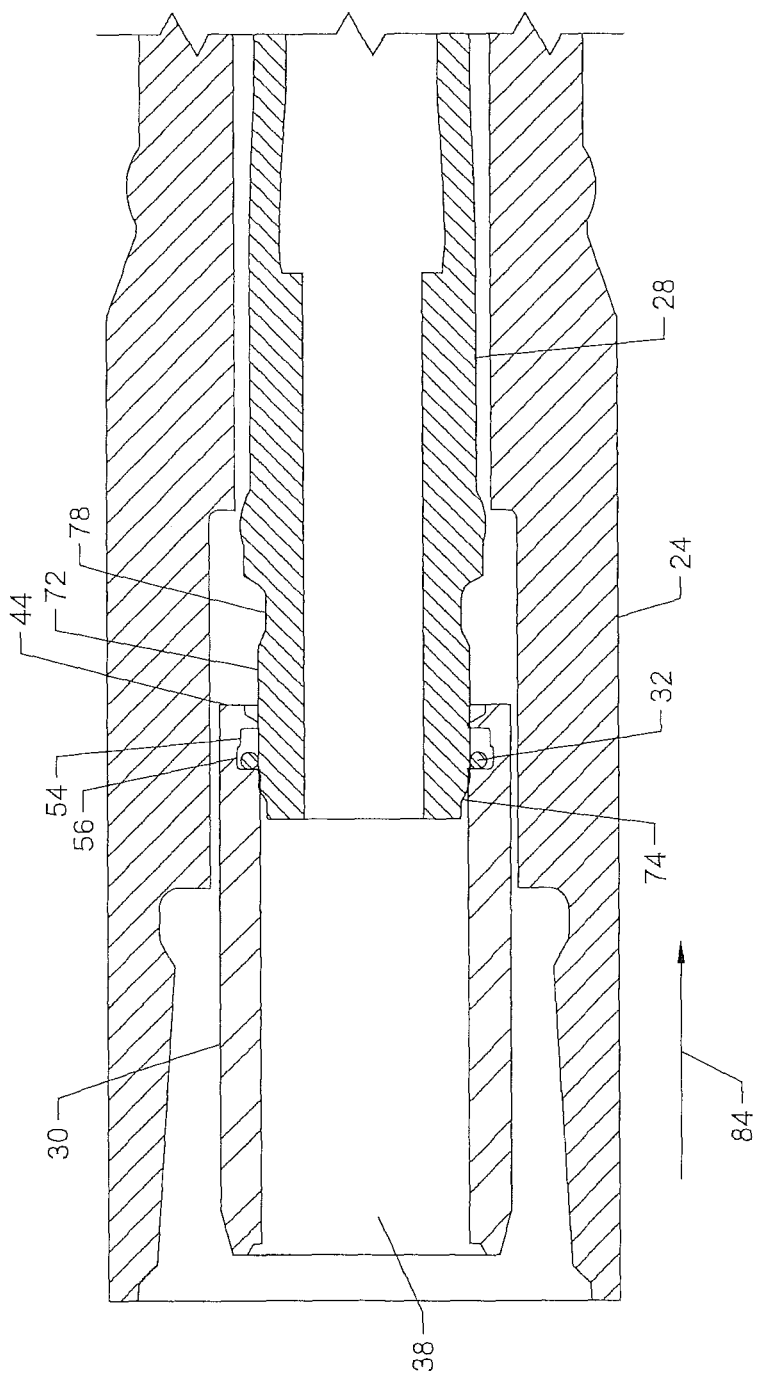
FIG. 7 is a cross-sectional view of the partial dual-member drill string of claim 6 showing a later stage of sliding the collar and retaining ring onto the first end of the inner pipe member.

Shown in FIGS. 6-13, the collar 30 and the inner pipe member 28 are assembled. In this embodiment, the retaining ring 32 is installed in the collar 30 before the inner pipe member 28 and the collar 30 are assembled. The collar 30 and the retaining ring 32 are installed on the inner pipe member 28 by bringing the inner pipe member 28 and the collar 30 together while they are coaxially aligned. This movement results in the first end section 72 of the inner pipe member 28 being received in the passage 38 of the first end 44 of the collar 30. During assembly, the collar 30 moves axially relative to the first inner pipe member 28 in a first direction 84. The retaining ring 32 expands circumferentially when it slides over the beveled portion 74 of the first end section 72. With reference to FIGS. 7 and 8, movement of the expanded retaining ring 32 relative to inner pipe member 28 continues in first direction 84. When the collar 30 and retaining ring 32 pass over the external groove 78 of the inner pipe member 28, the retaining ring 32 contracts circumferentially and relaxes into the external groove 78.

FIG. 9 shows the collar 30 in fully installed position on the inner pipe member 28. After assembly, the retaining ring 32 is situated within the grooves 52, 78 of both the collar 30 and the inner pipe member 28. Axial movement of the collar 30 relative to the inner pipe member 28 in the first direction 84 is limited when the internal shoulder 50 of the collar 30 contacts the external shoulder 76 of the inner pipe member 28.

As shown in FIGS. 6-9, the installation of the collar 30 on the inner pipe member 28 occurs within the outer drill string 22, though the outer drill string is not strictly necessary to installation. Use of the collar 30 to connect inner pipe members 28 in a dual-member drill string 14 is advantageous for saving time in making up and breaking the inner drill string connections without threading. The collar 30 may be pinned or welded to one pipe member 28 and the ring 32 used for connection to a received adjacent end section 72. The "pin end" of an inner pipe member may be on the "downhole" side of the pipe member while the collar 30 is attached to the "uphole" side, though the reverse configuration may be used. Likewise, in a dual-member drill string system, the connection between adjacent inner members 28 may take place before or after outer pipe members 24 are threaded or otherwise connected.

In FIG. 10, the retaining ring 32 is shown resisting the axial movement of the collar 30 relative to the inner pipe member 28 in a second direction 86 opposite to first direction 84. When the collar 30 moves in the second direction 86, the retaining ring 32 expands circumferentially as it slides over the ramp 82 of the inner pipe member 28. Before cresting the top of the ramp 82, the retaining ring 32 contacts the bottom 88 of the shallow section 54 of the internal groove 52. With reference to FIGS. 3, 4, and 10, because the maximum cross-sectional dimension E of the retaining ring 32 exceeds the depth D of the shallow section 54, the retaining ring 32 becomes wedged between the collar 30 and the inner pipe member 28. By resisting axial movement in the second direction 86, the connection between the collar 30 and the inner pipe member 28 is maintained. In order to remove the collar 30 from the inner pipe member 28, force sufficient to deform the retaining ring 32 is applied in the second direction 86.

In the embodiment described above, the retaining ring 32 is installed in the internal groove 52 of the collar 30 prior to connecting the collar 30 to the inner pipe member 28. However, in another embodiment, the retaining ring 32 may first be installed in the external groove 78 of the inner pipe member 28. The relaxed retaining ring 32 is sized to be retained within the external groove 78 of the inner pipe member 28. After inserting the retaining ring 32 into the external groove 78, the collar 30 and the inner pipe member 28 are coaxially aligned and brought together to form the connection.

FIG. 11 shows the outer pipe member 24, the collar 30, and the first end section 72 of the inner pipe member 28 centered on the collar axis 42 to form a torque-transmitting relationship between the collar 30 and the inner pipe member 28. The first end section 72 of the inner pipe member 28 has a plurality of sides 90 in which each pair of adjacent sides 90 is joined together at a vertex 92. Opposing vertices 92 are separated by a distance F.

To facilitate joining the inner pipe member 28 to the collar 30, the first end section 72 may slide into the collar 30 in any rotational orientation where each vertex 92 is positioned between a pair of adjacent longitudinal ridges 40. Contact between the longitudinal ridges 40 and the first end section 72 transfers torque between the collar 30 and the inner pipe member 28. Although FIG. 11 only shows the first end section 72 of the inner pipe member 28, the second end 70 of the inner pipe member 28 also has a section having a plurality of sides 90 formed in a polygonal shape to engage the longitudinal ridges 40 of the collar 30.

With reference to FIGS. 3, 4, and 11, in an embodiment, the distance between opposite vertices (F) is 1.615 inches, and the maximum cross-sectional dimension of the retaining ring (E) is 0.125 inches. The maximum cross-sectional dimension of the deep section (A) is between 1.865 and 1.875 inches. That dimension equals the sum of the distance between opposite vertices (F) plus twice the maximum cross-sectional dimension of the retaining ring (E) plus a manufacturing tolerance of between 0 and 0.010 inches. The maximum cross-sectional dimension of the shallow section (B) is 1.825 inches which equals the sum of the distance between opposite vertices (F) plus twice the maximum cross-sectional dimension of the retaining ring (E) minus 0.040 inches.

FIGS. 12 and 13 show the dual-member drill string 14 in which the collar 30 forms a torque-transmitting connection between identical, adjacent inner pipe members 28. The first end 44 of the collar 30 surrounds the first end section 72 of one of the inner pipe members 28 so that the internal and external grooves 52, 78 are in concentric relationship. The retaining ring 32 is situated within the internal and external grooves 52, 78. The second end 46 of the collar 30 surrounds the second end 70 of an adjacent inner pipe member 28. During a drilling operation, torque is transmitted between adjacent inner pipe members 28 as the sides 90 of each inner pipe member 28 contact the longitudinal ridges 40 in the surrounding collar 30 as shown in FIG. 11. Disconnection of the collar 30 from the first end section 72 of each inner pipe member 28 is inhibited by the wedged position of the retaining ring 32 between the collar 30 and the ramp 82 of the inner pipe member 28 as shown in FIG. 10.

Changes may be made in the construction, operation and arrangement of the various parts, elements, steps and procedures described herein without departing from the spirit and scope of the invention as described in the following claims.

The invention claimed is:

1. An assembly, comprising:
   a tubular collar having opposed first and second ends and an endless internal groove positioned adjacent the first end in which the groove has a base defining adjacent shallow and deep sections;
   a pipe member having an end positioned within the collar and an endless external groove positioned adjacent the end of the pipe member and situated in concentric relationship with the internal groove; and
   a retaining ring situated within the grooves of both the collar and the pipe section;
   in which the shallow section of the groove is situated closer to the first end of the collar than is the deep section.

2. The assembly of claim 1 in which the external groove is bounded on one side by a ramp.

3. The assembly of claim 2 in which the included angle between the ramp and the bottom of the external groove is between 120 and 165 degrees.

4. The assembly of claim 2 in which the included angle between the ramp and the bottom of the external groove is 135 degrees.

5. The assembly of claim 1, the collar having an internal shoulder positioned between the end of the collar and the internal groove and the pipe member having an external shoulder in which contact between the shoulders limits the axial movement of the collar and the pipe member relative to each other.

6. The assembly of claim 1 in which the retaining ring has a maximum cross-sectional dimension that exceeds the depth of the shallow section of the groove.

7. The assembly of claim 1 in which the collar's internal surface has a plurality of raised longitudinal ridges formed thereon.

8. The assembly of claim 1 in which the pipe member has a polygonal cross-sectional profile.

9. A system, comprising:
   a dual-member drill string positioned in the ground and having an inner drill string, comprising:
      the assembly of claim 1 in which the pipe member is a first pipe member; and
      a second pipe member, identical to the first pipe member and interconnected to the first pipe member by the collar.

10. A kit, comprising:
    a tubular collar having opposed first and second ends and an endless internal groove has a base defining adjacent shallow and deep sections;
    a pipe member having an end and an endless external groove positioned adjacent the end and configured to be concentric with the internal groove when the end of the pipe member is received within the collar; and
    a retaining ring sized to be retained within the internal groove and having a maximum cross-sectional dimension that exceeds the depth of the shallow section;
    in which the shallow section of the groove is situated closer to the first end of the collar than is the deep section.

11. The kit of claim 10 in which the external groove is bounded on one side by a ramp.

12. The kit of claim 11 in which the internal angle between the ramp and the bottom of the external groove is between 120 and 165 degrees.

13. The kit of claim 11 in which the internal angle between the ramp and the bottom of the external groove is 135 degrees.

14. The kit of claim 10 in which the collar's internal surface has a plurality of raised longitudinal ridges formed thereon.

15. The kit of claim 11 in which the pipe member has a polygonal cross-sectional profile.

16. A tubular collar having opposed first and second ends, comprising:
    an outer surface symmetric about a collar axis and having a circular cross-sectional profile;
    an inner surface having the cross-sectional profile of a polygon having a centroid situated on the collar axis; and
    an endless groove formed in the inner surface, concentric with the collar axis and positioned adjacent the first end of the collar, the groove having axially offset shallow and deep sections in which the shallow section is situated closer to the first end than is the deep section.

\* \* \* \* \*

UNITED STATES PATENT AND TRADEMARK OFFICE
CERTIFICATE OF CORRECTION

PATENT NO. : 10,487,595 B2
APPLICATION NO. : 15/637988
DATED : November 26, 2019
INVENTOR(S) : Wilson et al.

Page 1 of 1

It is certified that error appears in the above-identified patent and that said Letters Patent is hereby corrected as shown below:

In the Specification

Column 2, Line 11, please delete "to" and substitute therefore "10".
Column 2, Line 21, please delete "to" and substitute therefore "10".

In the Claims

Column 6, Claim 10, Line 3, after the word "groove", please insert --in which the groove--.

Signed and Sealed this
Seventh Day of January, 2020

Andrei Iancu
*Director of the United States Patent and Trademark Office*